United States Patent
Mavlankar et al.

(10) Patent No.: US 11,082,752 B2
(45) Date of Patent: Aug. 3, 2021

(54) SHOT-BASED VIEW FILES FOR TRICK PLAY MODE IN A NETWORK-BASED VIDEO DELIVERY SYSTEM

(71) Applicant: NETFLIX, INC., Los Gatos, CA (US)

(72) Inventors: Aditya Mavlankar, San Francisco, CA (US); Ioannis Katsavounidis, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/040,014

(22) Filed: Jul. 19, 2018

(65) Prior Publication Data

US 2020/0029131 A1  Jan. 23, 2020

(51) Int. Cl.
| | |
|---|---|
| *H04N 7/173* | (2011.01) |
| *H04N 21/6587* | (2011.01) |
| *G06F 16/78* | (2019.01) |
| *H04N 21/2387* | (2011.01) |
| *H04N 21/472* | (2011.01) |
| *H04N 21/845* | (2011.01) |

(52) U.S. Cl.
CPC ......... *H04N 21/6587* (2013.01); *G06F 16/78* (2019.01); *H04N 21/2387* (2013.01); *H04N 21/47217* (2013.01); *H04N 21/8455* (2013.01)

(58) Field of Classification Search
CPC .......... H04N 21/6587; H04N 21/2387; H04N 21/47217; H04N 21/8455; H04N 21/47202; G06F 16/78; G11B 27/005; G11B 27/105
USPC .......................................................... 725/87
See application file for complete search history.

(56) References Cited

U.S. PATENT DOCUMENTS

| | | | |
|---|---|---|---|
| 5,974,218 A | 10/1999 | Nagasaka et al. | |
| RE42,728 E * | 9/2011 | Madrane | G06F 16/745 715/716 |
| 8,090,200 B2 * | 1/2012 | Barletta | G06K 9/00711 382/168 |
| 8,365,235 B2 | 1/2013 | Hunt et al. | |
| 9,813,740 B2 * | 11/2017 | Panje | H04N 21/234363 |
| 9,888,279 B2 * | 2/2018 | Ishtiaq | H04N 21/4884 |
| 9,918,040 B2 * | 3/2018 | Lesh | H04N 5/783 |
| 9,930,405 B2 * | 3/2018 | Peterson | H04N 21/44016 |
| 10,057,655 B2 * | 8/2018 | Craner | H04N 21/812 |

(Continued)

FOREIGN PATENT DOCUMENTS

GB    2 312 078 A    10/1997

OTHER PUBLICATIONS

International Search Report for application No. PCT/US2019/042155 dated Sep. 26, 2019.

*Primary Examiner* — Jefferey F Harold
*Assistant Examiner* — Sahar Aqil Riaz
(74) *Attorney, Agent, or Firm* — Artegis Law Group, LLP

(57) ABSTRACT

A computer-implemented method includes receiving a request from a client computing device for a first shot included in a media title being streamed to the client computing device for playback; in response to the request, sending the first shot to the client computing device for playback; and sending a representative image for at least one of the first shot and a second shot included in the media title, wherein the first shot comprises a first sequence of video frames that is included in the media title and captured continuously from a first point of capture, and the second shot comprises a second sequence of video frames that is included in the media title and captured continuously from a second point of capture.

20 Claims, 9 Drawing Sheets

(56) References Cited

U.S. PATENT DOCUMENTS

| | | | |
|---|---|---|---|
| 10,373,648 B2* | 8/2019 | Sun | G11B 27/036 |
| 2003/0046638 A1* | 3/2003 | Thompson | G11B 27/105 |
| | | | 709/231 |
| 2003/0177503 A1* | 9/2003 | Sull | G06T 3/4092 |
| | | | 725/112 |
| 2007/0016611 A1* | 1/2007 | Wang | G11B 27/105 |
| 2007/0058876 A1 | 3/2007 | Tojo | |
| 2008/0288913 A1* | 11/2008 | Creighton | G06F 8/10 |
| | | | 717/100 |
| 2009/0158326 A1* | 6/2009 | Hunt | H04N 5/783 |
| | | | 725/38 |
| 2010/0303440 A1* | 12/2010 | Lin | H04N 5/76 |
| | | | 386/241 |
| 2012/0086773 A1* | 4/2012 | Park | H04N 13/106 |
| | | | 348/43 |
| 2013/0129317 A1* | 5/2013 | Moorer | H04N 21/2343 |
| | | | 386/241 |
| 2013/0259446 A1* | 10/2013 | Sathish | G11B 27/034 |
| | | | 386/278 |
| 2013/0259447 A1* | 10/2013 | Sathish | H04N 9/87 |
| | | | 386/278 |
| 2013/0324192 A1* | 12/2013 | Lee | H04M 1/0266 |
| | | | 455/557 |
| 2014/0068789 A1* | 3/2014 | Watts | H04W 12/08 |
| | | | 726/29 |
| 2014/0087356 A1* | 3/2014 | Fudemberg | G09B 7/00 |
| | | | 434/362 |
| 2015/0172775 A1* | 6/2015 | Yee | H04N 21/485 |
| | | | 725/37 |
| 2015/0181301 A1* | 6/2015 | Bloch | H04N 21/47217 |
| | | | 725/41 |
| 2015/0293675 A1* | 10/2015 | Bloch | G06F 3/04847 |
| | | | 715/723 |
| 2016/0269455 A1* | 9/2016 | Casey | H04N 21/8455 |
| 2016/0307596 A1* | 10/2016 | Hardin | H04L 65/40 |
| 2018/0014041 A1 | 1/2018 | Chen et al. | |
| 2018/0063217 A1* | 3/2018 | Barkley | H04L 65/607 |
| 2018/0152489 A1* | 5/2018 | Wood | H04L 65/4069 |
| 2018/0152743 A1* | 5/2018 | Wood | H04N 21/252 |
| 2018/0220203 A1* | 8/2018 | Markel | H04N 21/2353 |

* cited by examiner

SHOT-BASED VIEW FILES FOR TRICK PLAY MODE IN A NETWORK-BASED VIDEO DELIVERY SYSTEM

BACKGROUND

Field of the Various Embodiments

The present invention relates generally to playing streaming video and, more specifically, to shot-based view files for trick play mode in a network-based video delivery system.

Description of the Related Art

In interactive video-on-demand (VOD) systems, such as Internet-based video streaming services, a feature called "trick play" (also referred to as "trick mode") is incorporated into the user interface for navigating to different points in a selected video during playback. In particular, trick play enables users to selectively fast forward and/or fast reverse to different portions of the selected video by providing visual feedback to the user that indicates the various points in the selected video at which playback will start or resume when the user switches back to normal play mode from trick play mode. For example, in some implementations, a linear array of thumbnail images is displayed within the user interface when the user selects trick play mode, where each thumbnail image corresponds to a discrete portion of the normal play stream of the selected video. Moving forward or backward along the array of thumbnail images changes the point in the normal play stream at which playback will start or resume upon exiting trick play mode. However, the trick play feature in conventional VOD systems has several drawbacks.

First, there is inherently a temporal misalignment between most thumbnail images displayed during trick play and the exact video frame at which normal play commences when that thumbnail is selected. This temporal misalignment can range from a fraction of a second to several seconds and occurs because trick play thumbnail images are generated from different video frames than the video frames at which normal played actually resumes. For example, trick play thumbnail images are typically generated from video frames that are evenly spaced in time, such as every ten seconds, whereas the video frames at which normal play can resume are generally limited. Specifically, in some instances normal play is limited to resuming at certain intra-coded frames, which contain the video data for an entire frame of independently decodable video and are typically placed every 10 to 15 frames. Intra-coded frames (I frames) provide entry points into the normal play stream for random access, but such entry points do not necessarily align with video frames that correspond to the trick play thumbnail images presented to the user in trick play mode. As a result, when a trick play thumbnail image is selected by the user to begin normal play, the visual content in the first frame of video that is displayed in normal play mode oftentimes does not correspond to the visual content in the selected trick play thumbnail. Therefore, after selecting the point at which to begin normal playback in a video, the user may momentarily assume that normal play has resumed in location that is different than the location just selected by the user. This phenomenon can be disruptive to the viewing experience.

Second, the trick play thumbnail images displayed to a user during trick play oftentimes fail to highlight natural entry points back into the normal play of the selected video being played back. More specifically, as noted above, the trick play thumbnail images in conventional VOD systems usually correspond to evenly spaced time intervals within the normal play stream. Consequently, in situations where the selected video includes a long-duration shot, most or all of the trick play thumbnail images presented to the user for navigation can appear identical, thereby failing to provide the user with any meaningful navigation information. Such situations can be frustrating and time-consuming for the user. Conversely, in situations where the selected video includes multiple short-duration shots clustered together, some or all of those shots can fall within the time interval corresponding to a single trick play thumbnail image. Accordingly, the short-duration shots can be unwittingly skipped by a user as he/she navigates the selected video via the trick play thumbnail images in trick play mode. As a result, a user can waste significant time in search play mode searching back and forth for particular shots that are not represented by a given thumbnail image.

As the foregoing illustrates, what is needed in the art are more effective approaches to navigating to different locations within a streaming video during playback.

SUMMARY

A computer-implemented method includes receiving a request from a client computing device for a first sequence of video frames included in a media title being streamed to the client computing device for playback; in response to the request, sending the first sequence of video frames to the client computing device for playback; and sending a representative image for at least one of the first sequence of video frames and a second sequence of video frames included in the media title, wherein the first sequence of video frames is included in the media title and presents a first point of view, and the second sequence of video frames that is included in the media title and presents a second point of view.

At least one advantage of the disclosed techniques is that a user can perform shot-based navigation via trick play within a streaming audiovisual program. Thus, the user can seek forward or backward within the audiovisual program on a shot-by-shot basis, rather than via equal time intervals. A further advantage is that, when the user initiates normal playback by selecting a particular shot via a representative image, the first video frame of that shot will appear similar or identical to the representative image, which provides immediate visual feedback to the user that playback has begun at the desired time within the audiovisual program.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
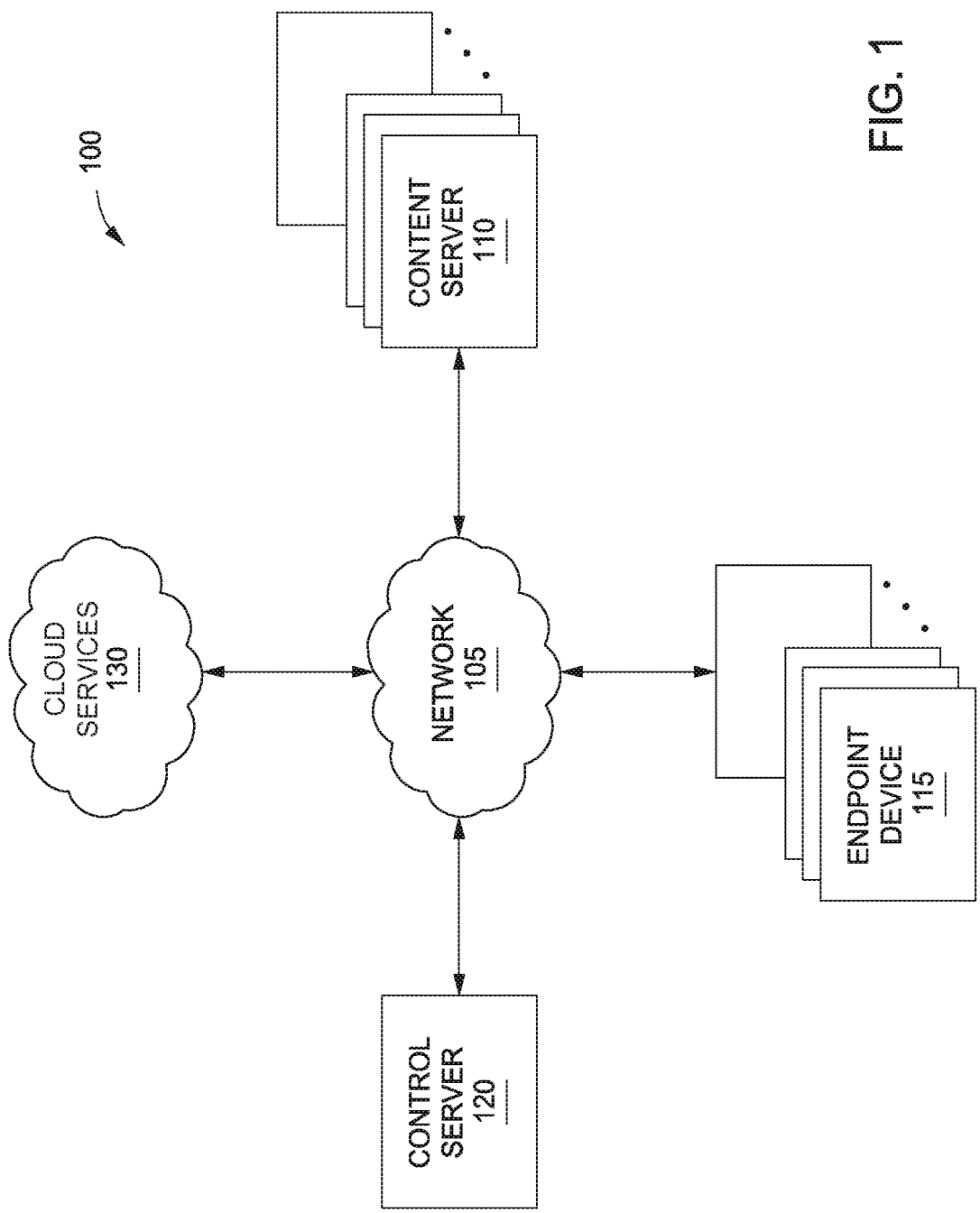
FIG. 1 illustrates a network infrastructure configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

Overview

In interactive video-on-demand (VOD) systems, a feature called "trick play" is incorporated in the user interface for navigating to different points in the video selection currently being viewed. Trick play enables users to selectively fast forward and/or fast reverse to a different portion of the video selection currently being viewed. Generally, the trick play feature in VOD systems provides visual feedback to the user in the form of a linear array of thumbnail images may be presented when the user selects trick play mode, where each thumbnail image displayed corresponds to a discrete portion of the normal play stream of the current video selection. Thus, moving forward or backward along the array of thumbnail images changes the point in time in the normal play stream that the current video selection will start playing. However, a drawback of conventional trick play systems is that there is inherently a temporal misalignment between most thumbnail images displayed during trick play and the exact video frame at which normal play commences when that thumbnail is selected. This temporal misalignment can range from a fraction of a second to several seconds. As a result, when a trick play thumbnail image is selected by the user to begin normal play, the visual content in the first frame of video that is displayed in normal play mode oftentimes does not correspond to the visual content in the selected trick play thumbnail. Therefore, after selecting the point at which to begin normal playback in a video, the user may momentarily assume that normal play has resumed in location that is different than the location just selected by the user. This phenomenon can be disruptive to the viewing experience.

In various embodiments, trick play in an interactive video-on-demand system is performed on a shot-by-shot basis. In contrast with conventional trick play features, in the embodiments, each trick play image displayed to a user on an endpoint device for navigation is a representative image of a different shot included in the audiovisual program. Therefore, when the user advances from one trick play image to another, the current point at which normal play begins advances from one shot to the next shot.

A trick play manifest that maps a specific time for starting normal play to each trick play image is transmitted to the endpoint device. In this way, when the user selects a particular trick play image to initiate normal play, the endpoint device can determine the appropriate portion of encoded video data to be requested in order to begin normal play.

Advantageously, a user can perform shot-based navigation via trick play within a streaming audiovisual program. Thus, the user can move forward or backward within the audiovisual program on a shot-by-shot basis, rather than via equal time intervals. A further advantage is that, when the user initiates normal playback by selecting a particular shot via a representative image, the first video frame of that shot will appear similar or identical to the representative image, which provides immediate visual feedback to the user that playback has begun at the desired time within the audiovisual program.

System Overview

FIG. 1 illustrates a network infrastructure 100, according to various embodiments of the invention. As shown, the network infrastructure 100 includes content servers 110, control server 120, and endpoint devices 115, each of which are connected via a communications network 105. Network infrastructure 100 is configured to distribute content to content servers 110, and such content is then distributed on demand to endpoint devices 115.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with cloud services 130 and one or more other content servers 110 in order to "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the cloud services 130 may include an online storage service (e.g., Amazon® Simple Storage Service, Google® Cloud Storage, etc.) in which a catalog of files, including thousands or millions of files, is stored and accessed in order to fill the content servers 110. Cloud services 130 also may provide compute or other processing services. Although only a single cloud services 130 is shown in FIG. 1, in various embodiments multiple cloud services 130 may be implemented.

Figure 2:
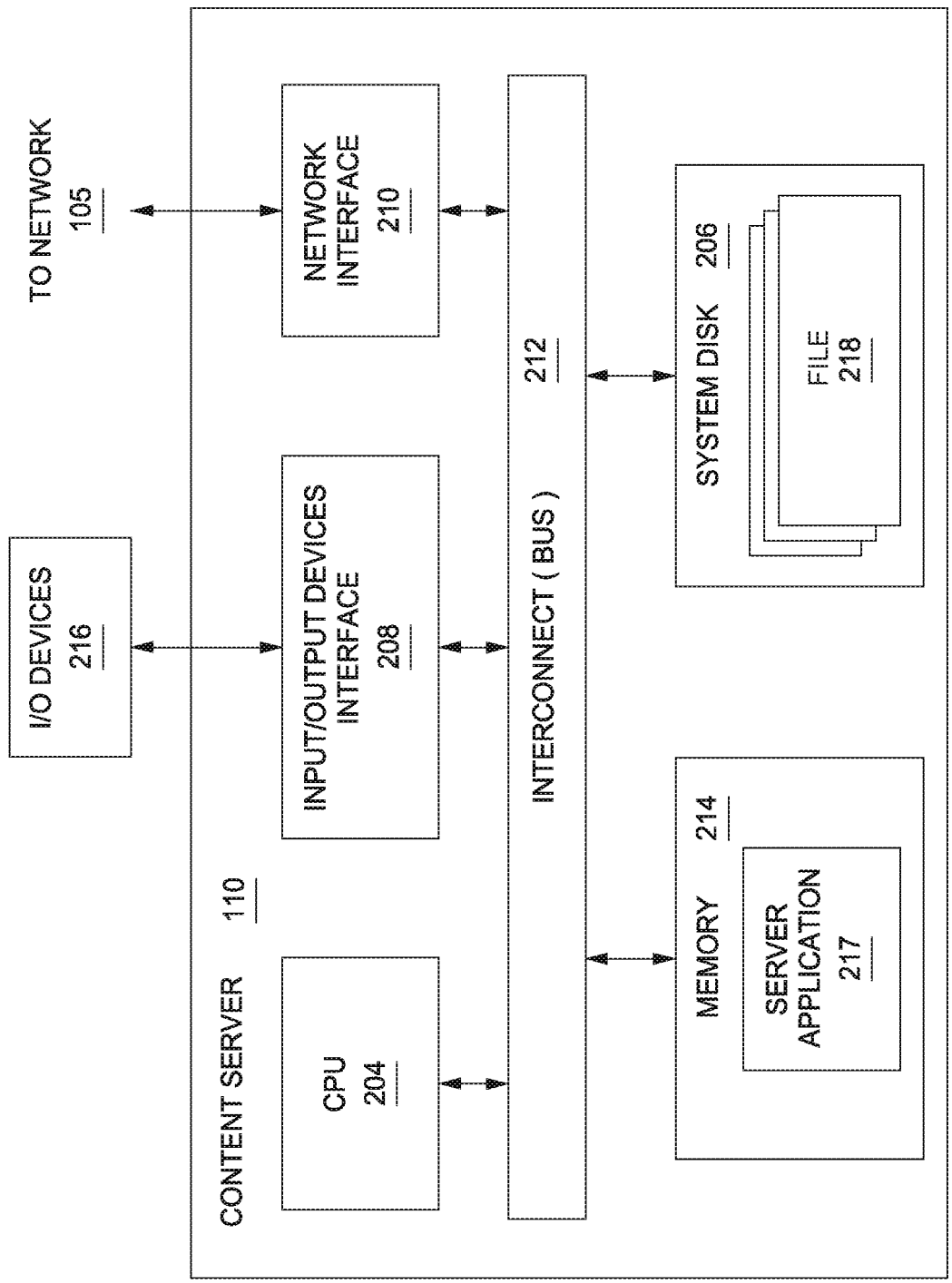
FIG. 2 is a more detailed illustration of the content server of FIG. 1, according to various embodiments of the present invention.

FIG. 2 is a more detailed illustration of content server 110 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105.

Files 218 include a plurality of digital visual content items, such as videos and still images. In addition, files 218 may include textual content associated with such digital visual content items, such as movie metadata. Files 218 may also include a plurality of trick play thumbnail images (described below) for each video stored in content server 110 or in other content servers 110. Files 218 may further include a trick play manifest (described below) for each video stored in content server 110 or in other content servers 110.

Figure 3:
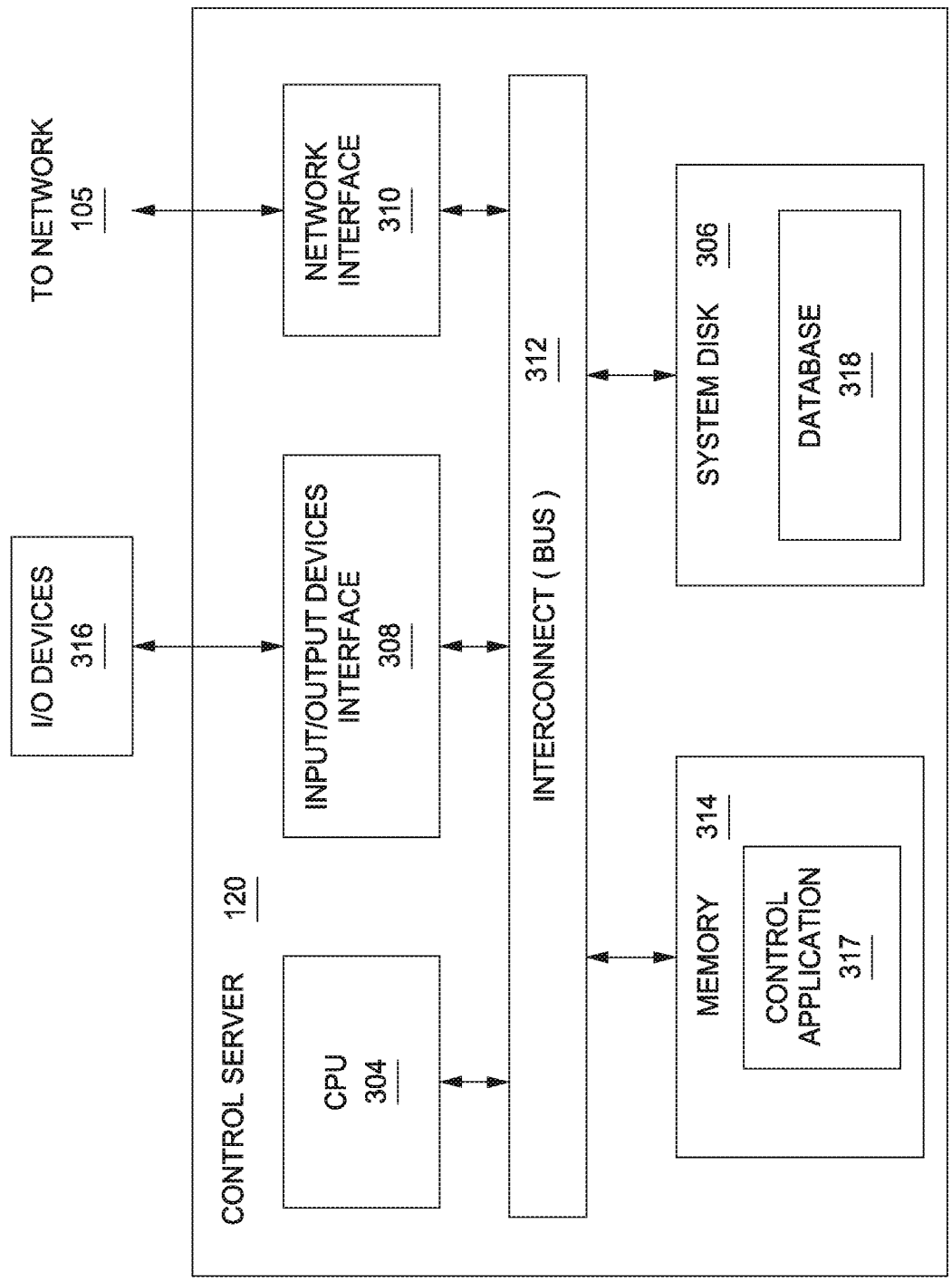
FIG. 3 is a more detailed illustration of the control server of FIG. 1, according to various embodiments of the present invention.

FIG. 3 is a more detailed illustration of control server 120 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 (shown in FIG. 2) is configured to store a database 318 of information associated with content servers 110, cloud services 130, and files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115.

Figure 4:
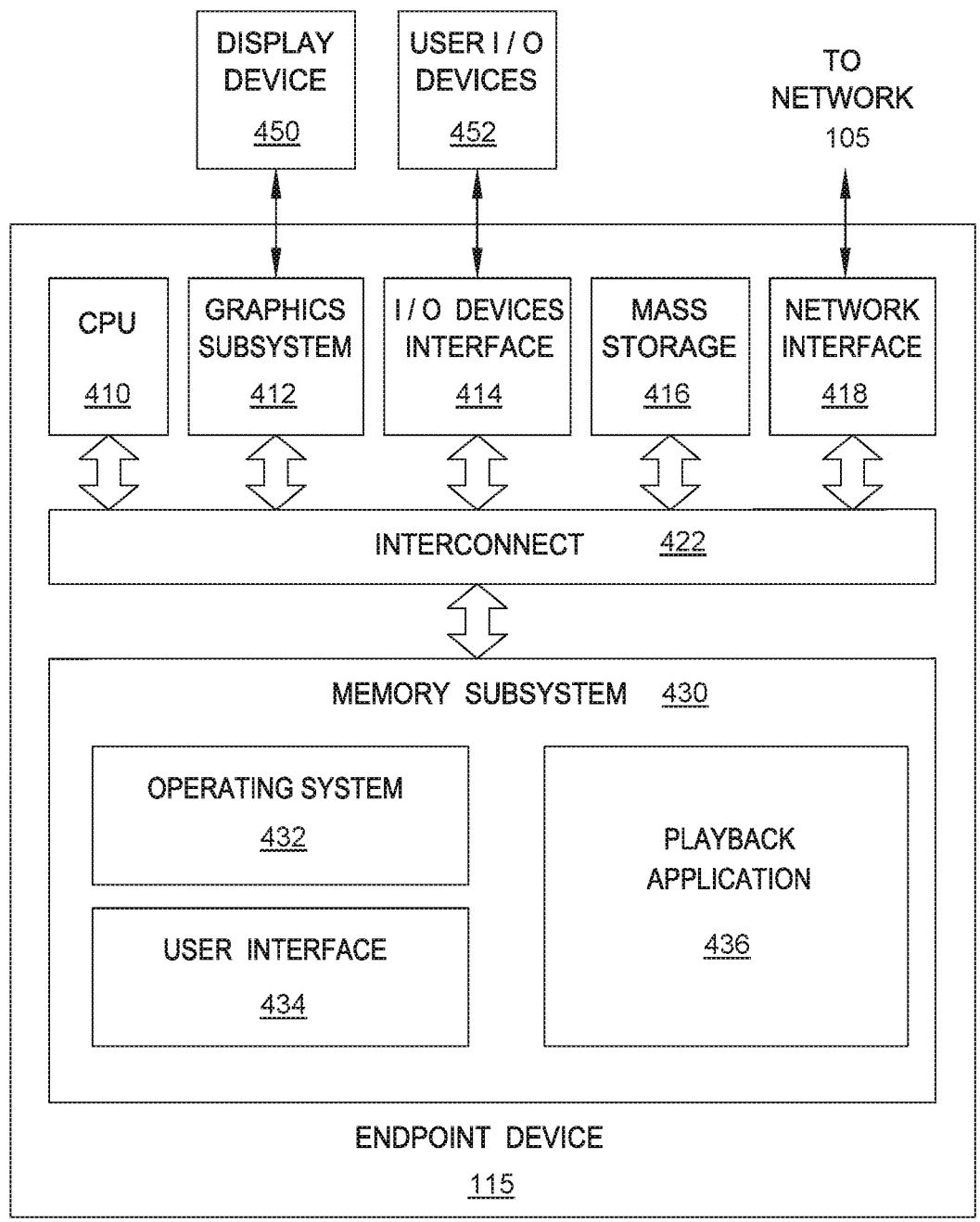
FIG. 4 is a more detailed illustration of the endpoint device of FIG. 1, according to various embodiments of the present invention.

FIG. 4 is a more detailed illustration of the endpoint device 115 of FIG. 1, according to various embodiments of the present invention. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray tube technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one of more buttons, a keyboard, and a mouse or other pointing device. The I/O device interface 414 also includes an audio output unit configured to generate an electrical audio output signal. User I/O devices 452 includes an audio speaker configured to generate an acoustic output in response to the electrical audio input signal. In alternative embodiments, the display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 115. Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via display device 450 and/or user I/O devices 452.

Trick Play Overview

Trick play for streaming media programs is a technique employed at an endpoint device 115 that enables simulated fast forward and rewind seeking to different locations within a streaming media file without the entire streaming media file first being downloaded by the endpoint device 115. Specifically, when trick play is evoked by a user of endpoint device 115 while viewing a streaming media file of an audiovisual program, a plurality of still images that each correspond to a different point in time within the streaming media file are displayed in a linear array in sequential order. The user can then navigate to a different point in the streaming media file by selecting a particular still image within the linear array. One embodiment of trick play is illustrated in FIG. 5.

Figure 5:
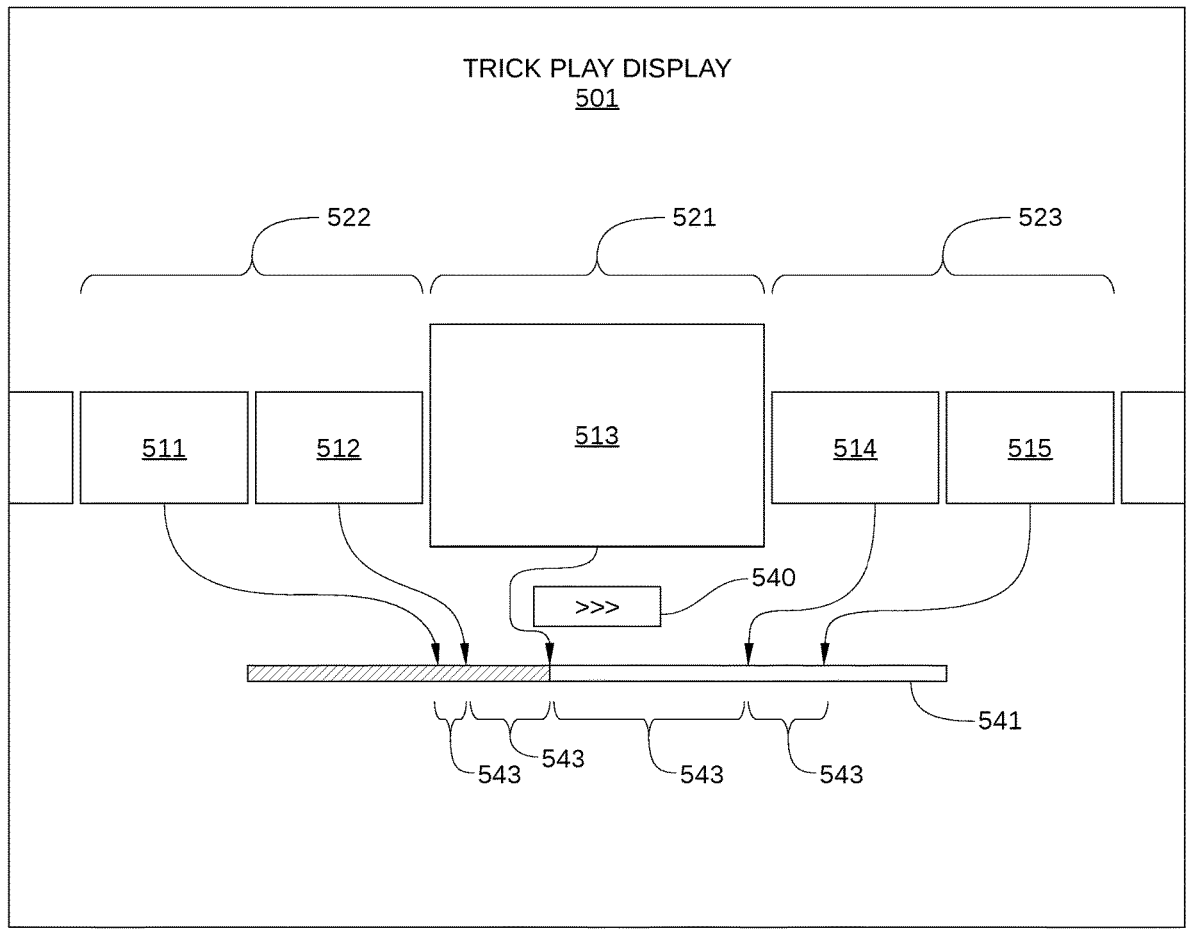
FIG. 5 schematically illustrates a trick play display showing multiple thumbnail images for navigating within an audiovisual program, according to various embodiments of the invention.

FIG. 5 schematically illustrates a trick play display 501 showing multiple thumbnail images 511-515 for navigating within an audiovisual program, according to various embodiments of the invention. Trick play display 501 can be generated by display device 450 of FIG. 4 or any other display device associated with endpoint device 115, and is displayed in response to a user input initiating or otherwise selecting trick play mode, trick mode, or another navigation mode. Trick play display 501 includes a current image position 521, one or more preceding image positions 522, and one or more following image positions 523. In some embodiments, screen display 501 may also include a movement icon 540 and a progress bar 541 to further facilitate navigation within the audiovisual program via trick play.

In trick play mode, trick play display 501 is displayed, and a different one of thumbnail images 511-515 is displayed at each of current image position 521, preceding image positions 522, and following image positions 523. Each of thumbnail images 511-515 is generated based on a different video frame of the audiovisual program, and corresponds to a different shot or other sequence of video frames within the audiovisual program. In some embodiments, a sequence of video frames on which one of thumbnail images 511-515 is based can be the sequence of video frames included in a fixed time interval that is employed in a fixed-interval trickplay mode, such as a specific 10-second interval for which one of thumbnail images 511-515 is generated and displayed to the user. In some embodiments, a sequence of video frames on which one of thumbnail images 511-515 is based can be a specific shot. Generally, a shot within an audiovisual program includes a sequence of video frames that have been captured continuously from a particular point of capture, or point of view. In some instances, for example when a moving camera was used to capture the sequence of video frames, a shot within an audiovisual program includes a sequence of video frames that presents a specific point of view, where the point of view moves from frame-to-frame. Further, in the case of animation (where the content is synthetically generated and there is no "point of capture" per se), a shot within an audiovisual program includes a sequence of video frames that have been generated to present a specific point of view to the user. Because each of thumbnail images 511-515 corresponds to a different sequence of video frames within the audiovisual program (such as a shot) that presents a specific point of view to the user, each of thumbnail images 511-515 corresponds to a natural entry point back into normal play of the audiovisual program, rather than to one in a series of evenly spaced entry points that can occur at any point within a shot or scene of the audiovisual program. For clarity of description, hereinafter, a "shot" can refer to a sequence of video frames that have been captured continuously from a particular point of capture or point of view, a sequence of video frames included in a fixed time interval that is employed in a fixed-interval trickplay mode, a sequence of video frames that presents a specific point of view to the user, and/or a sequence of video frames that have been generated to present a specific point of view to the user.

As indicated on progress bar 541, each of thumbnail images 511-515 corresponds to a different point in time within the timeline of the current audiovisual program. It is noted that the point in time associated with each of thumb nail images 511-515 is typically separated from the adjacent points in time by non-uniform time intervals 543, since each shot in the audiovisual program can be of a different and unique duration. Alternatively, in some embodiments, the point in time associated with each of thumb nail images 511-515 can be separated from the adjacent points in time by a uniform time interval, such as when embodiments described herein are applied to a fixed-interval trickplay system.

In trick play display 501, thumbnail images 511-515 are displayed in sequential order in preceding image positions 522, current image position 521, and following image positions 523. That is, each of thumbnail images 511-515 is displayed in the order in which the corresponding shot for that thumbnail image occurs in the audiovisual program. Thus, the thumbnail images 511 and 512 correspond to shots that are earlier in the audiovisual program than the shot associated with thumbnail image 513, and are therefore displayed in preceding image positions 522. Conversely, the thumbnail images 514 and 515 correspond to shots that are later in the audiovisual program than the shot associated with thumbnail image 513, and are therefore displayed in following image positions 523.

In general, only a relatively small portion of the total number of thumbnail images associated with the audiovisual program is displayed at one time to the user in trick play display 501. For example, a two-hour audiovisual program can includes hundreds or even thousands of individual shots, whereas trick play display 501 can only display a small number of thumbnail images 511-515 in a way that the content thereof can be readily determined by the user. In the embodiment illustrated in FIG. 5, trick play display 501 includes two preceding image positions 522 and two following image positions 523, but in other embodiments, trick play display 501 can include any suitable number of preceding image positions 522 and following image positions 523 that can accommodate thumbnail images sized so that the user can visually discern the content thereof. For example, on a wide-screen display device, trick play display 501 can include five or more preceding image positions 522 and five or more following image positions 523, and these thumbnail images can still be sufficiently large that the user can readily discern the content of each.

In some embodiments, endpoint device 115 causes trick play display 501 to be displayed in response to a user input from one of user I/O device 452 (shown in FIG. 4) requesting a trick play or other navigation function. For example, in some embodiments, the user requests the trick play function when the user presses a "fast forward" button of a user I/O device while viewing an audiovisual program via endpoint device 115 and a streaming video protocol enabled by playback application 436 (shown in FIG. 4). In response, playback application 436 causes display device 450 to display trick play display 501 and halts display of the streaming media. Thumbnail images 511-515 are selected that correspond to the shot that was just being displayed, the shots immediately preceding the shot that was just being displayed, and the shots immediately following the shot that was just being displayed. In some embodiments, only trick play display 501 is rendered, and the full-screen full-motion display of the audiovisual program vanishes. In other embodiments, the full-screen full-motion display of the audiovisual program is frozen, and trick play display 501 is superimposed or otherwise overlaid on the frozen video frame. In such embodiments, the frozen video frame may be darkened or dimmed to indicate that trick play is active and to visually emphasize trick play display 501. Thumbnail images 511-515 move successively from right to left when fast forward control proceeds and from left to right as rewind control proceeds.

Implementation of Shot-Based Trick Play

Figure 6:
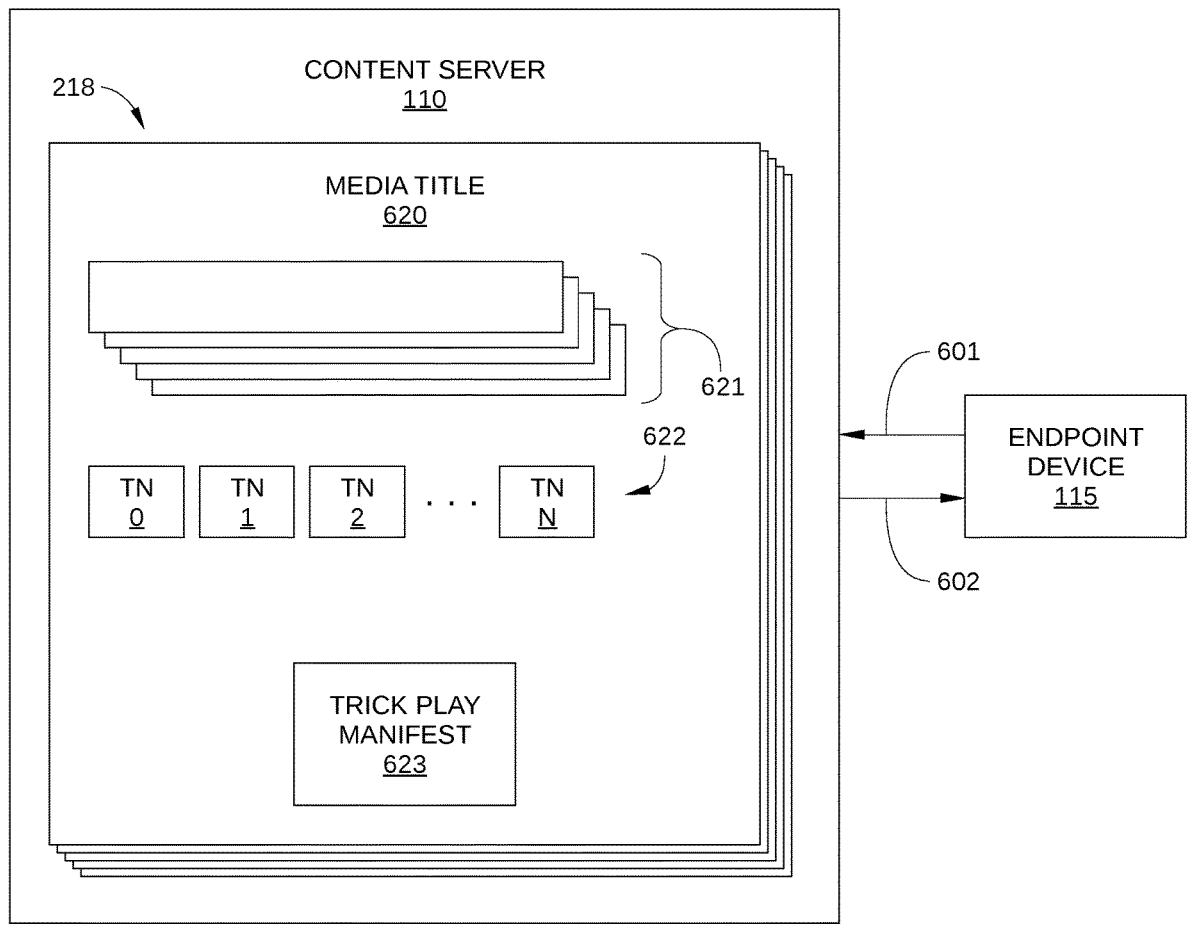
FIG. 6 illustrates information for trick play mode navigation that is transmitted from the content server to the endpoint device of FIG. 1, according to various embodiments of the present invention.

FIG. 6 illustrates information for trick play mode navigation that is transmitted from content server 110 to endpoint device, according to various embodiments of the present invention. As shown, content server 110 includes various files 218 that enable shot-based trick play as described herein. Specifically, files 218 include a plurality of media titles 620, which can be any available audiovisual program, such as movies, documentaries, specific episodes of a television program or series, and the like. Each media title 620 includes a bitrate ladder 621 (also referred to as a "quality ladder"), a plurality of thumbnail images 1-N (referred to collectively as thumbnail images 622), and a trick play manifest 623. Content server 110 receives requests 601 for data from endpoint device 115 and transmits responses 602 to requests 601. Responses 602 can include portions of an encoded video sequence associated with bitrate ladder 621, thumbnail images 622, and trick play manifest 623.

Bitrate ladder 621 for a particular media title 620 includes multiple versions of media title 620 to stream to endpoint device 115. Each different version of media title 620 in bitrate ladder 621 is usually encoded using a different bitrate, and the different versions of media title 620 have resolutions, scaling factors, and/or other parameters typically associated with video content that differ from one another. During playback of media title 620 on endpoint device 115, an endpoint application (such as, for example, playback application 436) selects the appropriate version from bitrate ladder 621 to stream to endpoint device 115 based on factors such as network conditions, the quality of the network connection, and the hardware specifications of the particular endpoint device 115.

Each of thumbnail images 622 is generated from a video frame included in a different respective shot of media title 620. Media title 620 generally includes a series of shots and, in many instances, subgroups of this series of shots are organized into scenes. In addition, in some instances, the scenes of media title 620 are further organized into chapters or some other higher-level hierarchical structure. As noted above, because one thumbnail image 622 corresponds to one shot of media title 620, selection by the user of a particular thumbnail image 622 while in trick play mode enables the user to cause normal playback to resume at the beginning of that shot. Thus, by viewing thumbnail images 622 during trick play, the user can determine the current normal playback position in media title 620 based on shots, which are natural milestones for navigation. It is noted that the way video frames of media title 620 are organized can be determined during encoding of the various versions of media title 620 in bitrate ladder 621. That is, which video frames of media title 620 are included in which shots and scenes can be determined during such encoding. Alternatively, in some instances, the organization of the video frames of media title 620 can be provided as metadata by the studio that produced that particular media title 620.

Each of thumbnail images 622 is based on or generated from a representative frame of a different respective shot (or other sequence of video frames that presents a specific point of view to the user) included in media title 620. In some embodiments, the thumbnail images 622 for some or all of the shots of a particular media title 620 are generated from the first video frame of the associated shot. In other embodiments, the thumbnail images 622 for some or all of the shots of a particular media title 620 are generated from a video frame that is selected as the "average" video frame included in the associated shot. For example, the average video frame included in the shot can be the video frame that looks the most like, or varies the least from, most of the video frames in that shot. Thus, in some embodiments, the average video frame can be determined based on a comparison of pixel-color histograms of each video frame in the shot. Alternatively, any other algorithm for determining an average video frame of a shot can be employed. In yet another embodiment, the thumbnail image 622 for some or all of the shots of a particular media title 620 are generated from the video frame included in the associated shot that is selected as meeting a certain "quality" metric, such as lack of blurring, not including fade-in or fade-out effects, and the like. In some embodiments, the thumbnail image 622 for some or all of the shots of a particular media title 620 can be generated from a video frame included in the associated shot that meets any other metric for being representative of that shot, such as the middle video frame, the first video frame in the shot after fade-in has occurred, and the like.

Figure 7:
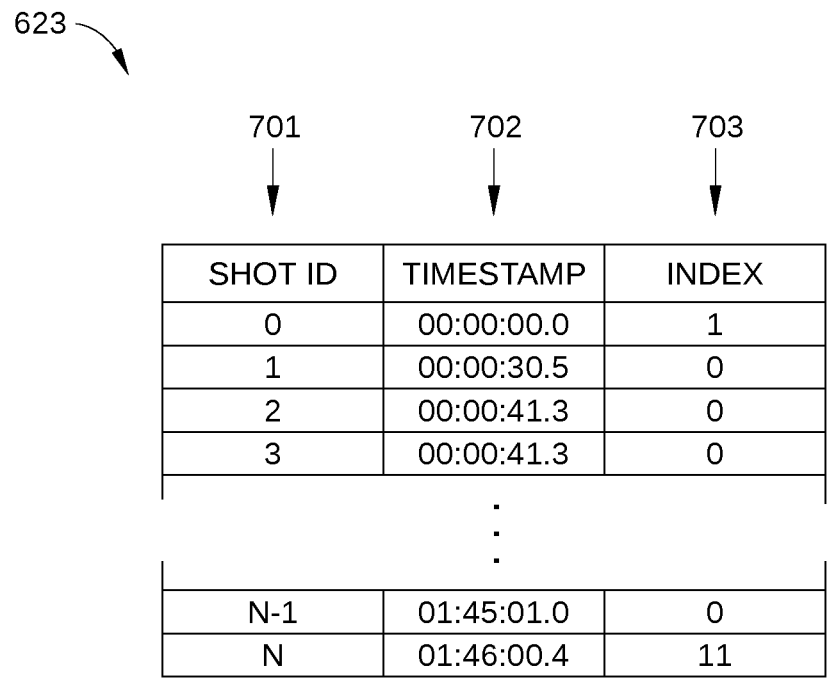
FIG. 7 is a more detailed illustration of the trick play manifest of FIG. 6, according to various embodiment of the present invention.

Trick play manifest 623 for a particular media title includes a table or other data structure that stores trick play metadata for each shot of media title 620. One embodiment of trick play manifest 623 is illustrated in FIG. 7. FIG. 7 is a more detailed illustration of trick play manifest 623, according to various embodiments of the present invention. In the embodiment illustrated in FIG. 7, trick play manifest 623 includes, for each shot of media title 620, a shot identifier (shot ID) 701, a timestamp 702 or other timing information, and, in some embodiments, an index 703. Shot IDs 701 uniquely identify each of the N shots included in media title 620. Timestamp 702 for each shot indicates the specific time in media title 620 that the shot begins. Index 703 includes other information related to each shot of media title 620. In some embodiments, a different value of index 703 indicates a different status, attribute, or combination of attributes of that particular shot. For example, an index value of 0 can indicate that the shot is a regular shot; an index value of 1 can indicate that the shot is a scene-level shot that corresponds to the beginning of a scene in media title 620; an index value of 2 can indicate that the shot is a chapter-level shot that corresponds to the beginning of a chapter in media title 620; an index value of 3 can indicate that the shot includes the first frame of an episode that is not the title score of the episode; and so on. Thus, index 703 can enable playback application 436 running on endpoint device 115 to make more complicated decisions regarding the priority and application of each shot, and in what order each thumbnail image 622 for each shot should be requested. Further, index 703 enables such decisions with a small number of bits of information for each shot in media title 620. In some embodiments, trick play manifest 623 includes other information for each shot of media title 620, such as what video frames are included in each shot, etc.

It is noted that in manifest 623, the value of timestamp 702 for a particular shot corresponds to the first video frame of that shot, but does not necessarily correspond to the video frame used to generate the thumbnail image 622 associated with that shot. That is, thumbnail image 622 for a particular shot is not necessarily generated from the first video frame of that shot.

Figure 8:
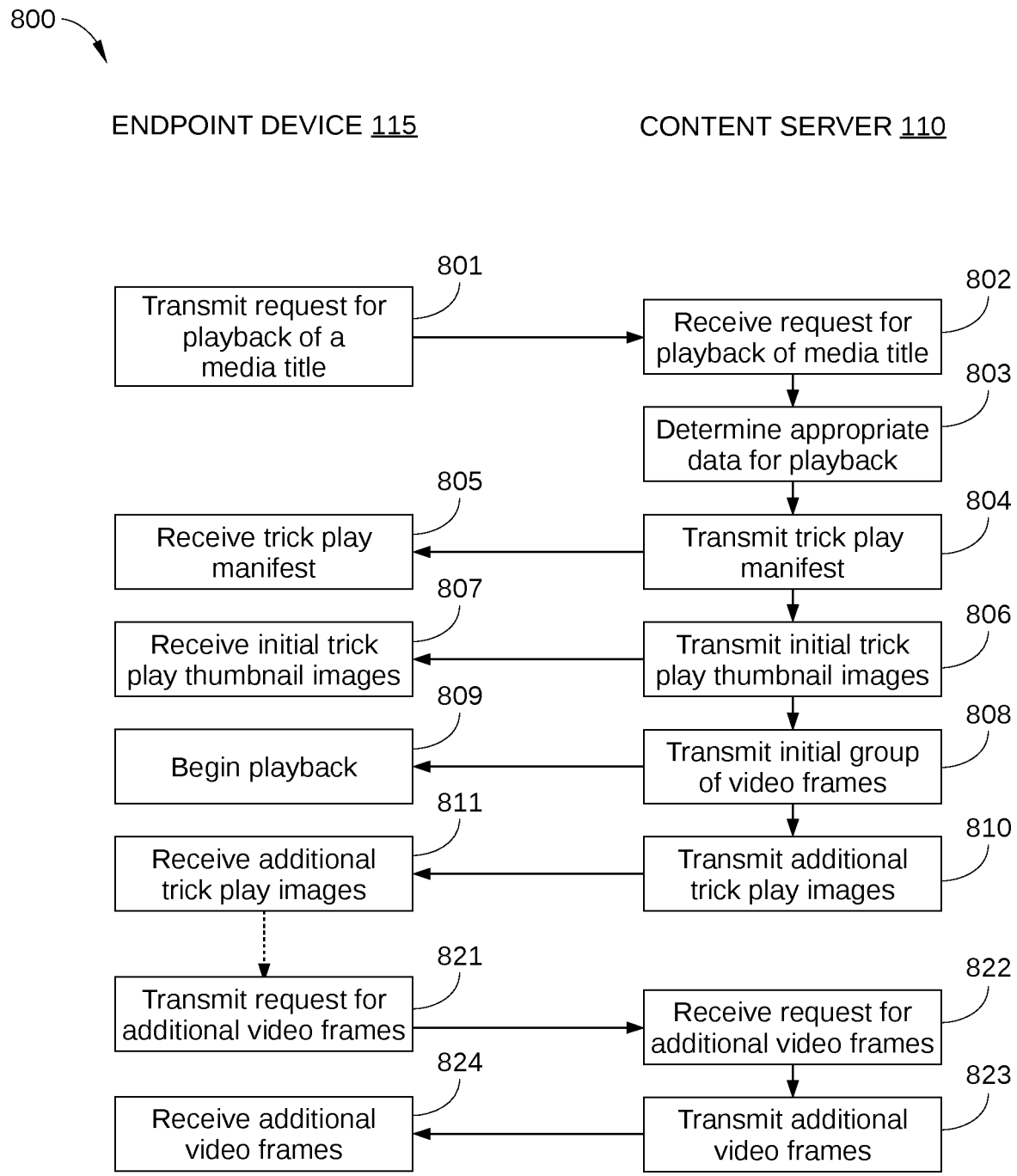
FIG. 8 sets forth a flowchart of method steps for implementing shot-based trick play, according to various embodiments of the present invention.

FIG. 8 sets forth a flowchart of method steps for implementing shot-based trick play, according to various embodiments of the present invention. Although the method steps are described with respect to the systems of FIGS. 1-7, persons skilled in the art will understand that any system configured to perform the method steps, in any order, falls within the scope of the present invention.

As shown, a method 800 begins at step 801, in which endpoint device 115 transmits a request 601 for playback of a particular media title 620. In some embodiments, request 601 includes metadata associated with the particular endpoint device 115 transmitting request 601, such as device information and/or metadata associated with the media title 620 included in request 601. For example, such metadata associated with the media title 620 may include information indicating a viewing history of endpoint device 115 with respect to media title 620.

In step 802, content server 110 receives the request for playback of media title 620.

In step 803, content server 110 determines appropriate data for playback. For example, in some embodiments, content server 110 determines the version of media title 620 in bitrate ladder 621 to stream to endpoint device 115. In addition, in some embodiments, content server 110 may determine at what point in media title 620 playback is to begin, i.e., what specific video frames are to be transmitted to endpoint device 115. In such embodiments, endpoint device 115 may include that point in request 601, or content server 110 may determine that point based on a previous viewing history of endpoint device 115 with respect to media title 620.

In step 804, content server 110 transmits trick play manifest 623 to endpoint device 115. In instances in which transmission of trick play manifest 623 for media title 620 can add significantly to latency in beginning playback of media title 620 on endpoint device 115, content server 110 transmits only an initial portion of trick play manifest 623 to endpoint device 115. For example, when there is a low bandwidth connection between endpoint device 115 and content server 110, or when trick play manifest 623 is of sufficient size, content server 110 does not transmit trick play manifest 623 to endpoint device 115 in a single operation.

In step 805, endpoint device 115 receives some or all of trick play manifest 623. If a user has requested trick play at endpoint device 115, endpoint device 115 can then consult trick play manifest 623 and request the appropriate thumbnail images 622 that correspond to the current location at which playback will start in media title 620. In instances in which viewing of media title 620 was halted at a certain point, playback will generally start in media title 620 at that point.

In step 806, content server 110 transmits an initial group of thumbnail images 622 to endpoint device 115. For example, in some embodiments, content server 110 transmits thumbnail images 622 that correspond to the shots immediately before and after the current location at which playback will start in media title 620. Alternatively or additionally, in some embodiments, content server 110 can also transmit any other higher priority thumbnail images 622 to endpoint device 115, such as thumbnail images 622 that correspond to starting points of scene or chapter boundaries within media title 620. Thus, in such embodiments, navigation within media title 620 at the scene level and/or the chapter level is enabled shortly after playback is requested by the user.

In step 807, endpoint device 115 receives the initial group of thumbnail images 622 transmitted by content server 110 in step 806. When appropriate, such as when the user has requested trick play mode, endpoint device 115 then causes trick play display 501 to be displayed to the user while populated with some of the initial group of thumbnail images 622.

In step 808, content server 110 transmits an initial group of video frames to endpoint device 115. For example, in some embodiments, content server 110 transmits some or all of the video frames referenced in request 601 to endpoint device 115.

In step 809, endpoint device 115 receives the initial group of video frames transmitted by content server 110. When appropriate, such as when the user has requested playback, endpoint device 115 then begins playback of media title 620 using the initial group of video frames transmitted by content server 110.

In step 810, content server 110 transmits additional thumbnail images 622 to endpoint device 115. Thus, when endpoint device 115 is in playback mode, content server 110 intersperses the transmission of thumbnail images 622 with video frames being requested as part of playback mode, so that playback can begin without being delayed by the downloading of hundreds or thousands of trick play images.

In step 821, which occurs at some point after endpoint device 115 has transmitted request 601 in step 801, endpoint device 115 transmits a request for additional video frames from content server 110. In some instances, the request is for additional video frames as part of continuing playback of media title 620. In other instances, the request is for video frames requested via trick play. In such instances, a user initiates trick play and, after navigating through media title 620 to a desired location, selects the thumbnail image 622 displayed in trick play display 501 that appears to correspond to the specific shot of interest to the user. Thus, in response to such an input, endpoint device 115 consults trick play manifest 623, and determines what point in time in media title 620 corresponds to the selected shot based on the timestamp information included in trick play manifest 623. Endpoint device 115 then includes in the request the time determined in this way, which aligns with the first video frame of the selected shot. Alternatively, endpoint device 115 may determine the specific video frames based on the timestamp associate with the selected shot, and request such video frames directly.

In step 822, content server 110 receives the request for additional video frames from endpoint device 115. In instances in which the request is initiated via a user selection in trick play mode, content server 110 may receive a specific timestamp indicating at what point in media title 620 the requested video frames should begin. Alternatively, endpoint device 115 may include the requested video frame numbers explicitly.

In step 823, content server 110 transmits the additional video frames.

In step 824, endpoint device 115 receives the additional video frames. In instances in which the additional video frames are requested in response to a quick play selection of a particular shot in media title 620, endpoint device 115 begins playback (i.e., full-screen, full-motion display) with the first video frame of the selected shot. It is noted that, because the trick play image selected by the user in step 821 is a representative image of the corresponding shot, the first video frame of the selected shot that is displayed in playback of the media title 620 will be very close to or indistinguishable from the trick play image selected by the user. Thus, the user receives immediate visual feedback confirming that playback has begun at the desired point in media title 620.

It is noted that method 800 is a simplified description of the interactions taking place between endpoint device 115 and content server 110. One of skill in the art will readily understand that additional communications may occur between endpoint device 115 and content server 110 for implementing trick play and associated streaming of media content.

Figure 9:
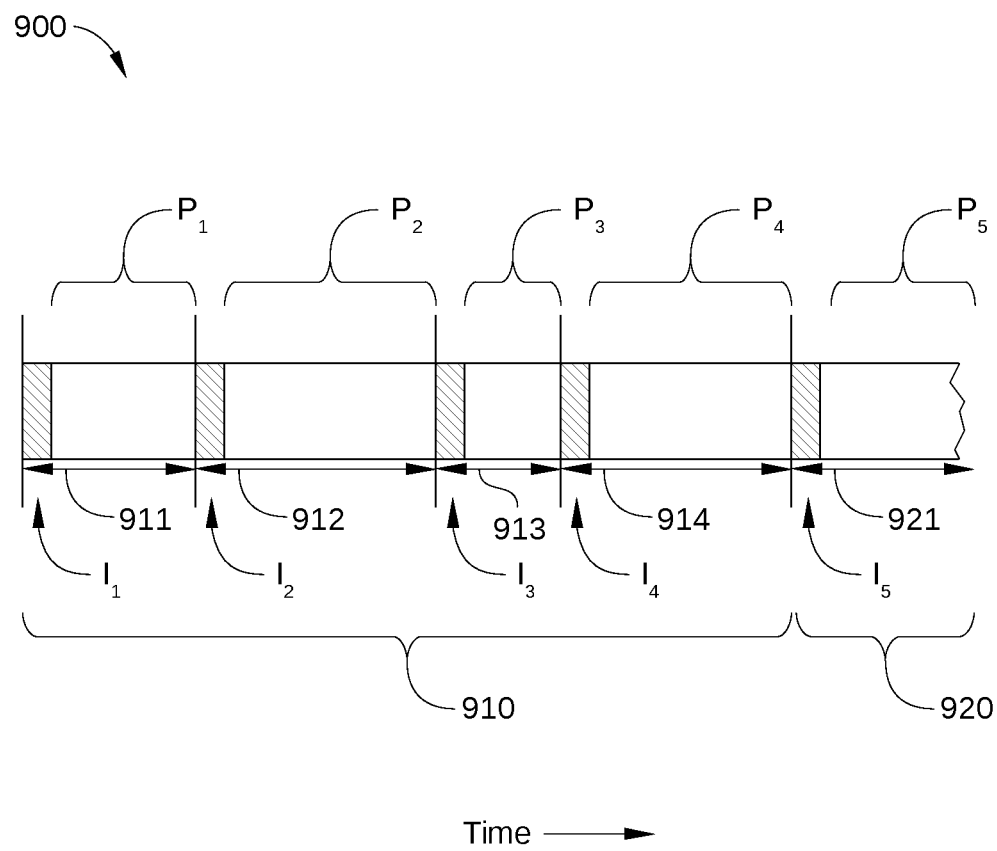
FIG. 9 schematically illustrates a portion of a media title as a timeline, according to various embodiments of the present invention.

In some embodiments, the thumbnail images 622 for some or all of the shots of a particular media title 620 are generated from the first intra frame (or "I frame") of the associated shot. One such embodiment is illustrated in FIG. 9. FIG. 9 schematically illustrates a portion 900 of a media title 620 as a timeline, according to various embodiments of the present invention. Portion 900 includes a scene 910 and a portion of a scene 920 that immediately follows scene 910 along the timeline. Scene 910 includes multiple shots 911-914. Scene 910 and scene 920 each include intra frames (I frames) and predicted frames (P frames) or other interpredicted frames. Specifically, scene 910 includes I frames I1, I2, I3, and I4, and associated groups of P frames P1, P2, P3, and. Similarly, scene 920 includes at least I frame I5, and an associated group of P frames P5. I frames I1, I2, I3, I4, and I5 are the first video frames of shots 911, 912, 913, 914, and 921, respectively. Scene 910 and scene 920 may include additional I frames besides those located at the beginning of each shot, but such I frames are omitted from FIG. 9 for clarity.

I frames contain the video data for an entire frame of video and are placed periodically throughout media title 620, for example every 60 to 300 video frames. I frames provide entry points into the file for random access, and are generally only moderately compressed. Predicted frames are encoded with reference to a past frame, such as a previous I frame or P frame. Thus, P frames only include changes relative to the prior I or P frame. In general, P frames are significantly compressed.

In embodiments in which the thumbnail images 622 for the shots of a particular media title 620 are generated from the first I frame of the associated shot, endpoint device 115 generates thumbnail images 622, and stores each of these I frames for later decoding during normal playback. Thus, in such embodiments, an additional stream of data, i.e., thumbnail images 622 for trick play mode, are not transmitted in parallel with the encoded video sequence employed for normal playback. As a result, less total bandwidth is employed in the playback of a given media title 620.

In sum, various embodiments set forth systems and techniques for performing trick play in an interactive video-on-demand system on a shot-by-shot basis. In contrast with conventional trick play features, in the embodiments, each trick play image displayed to a user on an endpoint device for navigation is a representative image of a different shot included in the audiovisual program. Therefore, when the user advances from one trick play image to another, the current point at which normal play begins advances from one shot to the next shot. A trick play manifest that maps a specific time for starting normal play to each trick play image is transmitted to the endpoint device. In this way, when the user selects a particular trick play image to initiate normal play, the endpoint device can determine the appropriate portion of encoded video data to be requested in order to begin normal play At least one technological improvement of the disclosed embodiments is that a user can perform shot-based navigation via trick play within a streaming audiovisual program. Thus, the user can move forward or backward within the audiovisual program on a shot-by-shot basis, rather than via images that represent equal time intervals. A further technological improvement is that, when the user initiates normal playback by selecting a particular shot via a representative image, the first video frame of that shot can appear similar or identical to the representative image, which provides immediate visual feedback to the user that playback has begun at the desired time within the audiovisual program.

1. In some embodiments, a computer-implemented method, comprises: receiving a request from a client computing device for a first sequence of video frames included in a media title being streamed to the client computing device for playback; in response to the request, sending the first sequence of video frames to the client computing device for playback; and sending a representative image for at least one of the first sequence of video frames and a second sequence of video frames included in the media title, wherein the first sequence of video frames is included in the media title and presents a first point of view, and the second sequence of video frames that is included in the media title and presents a second point of view.

2. The computer-implemented method of clause 1, further comprising, while sending the first sequence of video frames to the client computing device, sending a manifest referencing a plurality of representative images to the client computing device, wherein each representative image is associated with a different sequence of video frames included in the media title, and each sequence of video frames presents a respective point of view.

3. The computer-implemented method of clauses 1 or 2, wherein the manifest includes metadata associated with each representative image included in the plurality of representative images, and the metadata associated with a given representative image included in the plurality of representative images indicates a first point in time in the media title that corresponds to a start point of the sequence of video frames associated with the given representative image.

4. The computer-implemented method of any of clauses 1-3, wherein the first point in time in the media title corresponding to the start point of the sequence of video frames associated with the given representative image does not correspond to a second point in time in the media title corresponding to a start point of a video frame from which the given representative image is generated.

5. The computer-implemented method of any of clauses 1-4, wherein the metadata associated with the given representative image further indicates at least one of a status, an attribute, and a combination of attributes associated with the sequence of video frames associated with the given representative image.

6. The computer-implemented method of any of clauses 1-5, wherein the metadata associated with the given representative image includes an index that, when having a first value, indicates one of a first status or first attribute associated with the given representative image and, when having a second value, indicates one of a second status or second attribute associated with the given representative image.

7. The computer-implemented method of any of clauses 1-6, wherein the metadata associated with the given representative image indicates that the sequence of video frames associated with the given representative image is a first sequence of video frames in a scene included in the media title or a first sequence of video frames in a chapter included in the media title.

8. The computer-implemented method of any of clauses 1-7, wherein the representative image for the second sequence of video frames comprises a thumbnail image generated from a representative video frame included in the second sequence of video frames.

9. The computer-implemented method of any of clauses 1-8, wherein the first sequence of video frames are captured continuously from a first point of capture and the second sequence of video frames is captured from a second point of capture.

10. A non-transitory computer-readable storage medium including instructions that, when executed by one or more processors, configure the one or more processors to perform the steps of: receiving a request from a client computing device for a first sequence of video frames included in a media title being streamed to the client computing device for playback; in response to the request, sending the first sequence of video frames to the client computing device for playback; and sending a representative image for at least one of the first sequence of video frames and a second sequence of video frames included in the media title, wherein the first sequence of video frames is included in the media title and presents a first point of view, and the second sequence of video frames is included in the media title and presents a second point of view.

11. The non-transitory computer-readable storage medium of clause 10, wherein the representative image for the second sequence of video frames comprises a thumbnail image generated from a representative video frame included in the second sequence of video frames.

12. The non-transitory computer-readable storage medium of clauses 10 or 11, wherein the representative video frame included in the second sequence of video frames comprises a video frame that meets a given quality metric.

13. The non-transitory computer-readable storage medium of any of clauses 10-12, wherein the representative video frame included in the second sequence of video frames comprises an intra-coded frame of the second sequence of video frames.

14. The non-transitory computer-readable storage medium of any of clauses 10-13, wherein the representative video frame included in the second sequence of video frames comprises an average video frame that is selected based on a difference between the representative video frame included in the second sequence of video frames and one or more other video frames included in the second sequence of video frames.

15. The non-transitory computer-readable storage medium of any of clauses 10-14, wherein the second sequence of video frames includes a first video frame that is immediately subsequent to a last video frame included in the first sequence of video frames in the media title.

16. The non-transitory computer-readable storage medium of any of clauses 10-15, wherein the second sequence of video frames includes a last video frame that is immediately prior to a first video frame included in the first sequence of video frames in the media title.

17. The non-transitory computer-readable storage medium of any of clauses 10-16, further comprising instruction that, when executed by one or more processors, configure the one or more processors to perform the step of: while sending the first sequence of video frames to the client computing device, sending a manifest referencing a plurality of representative images to the client computing device, wherein each representative image is associated with a different sequence of video frames included in the media title, and each sequence of video frames presents a respective point of view.

18. The non-transitory computer-readable storage medium of any of clauses 10-17, wherein the manifest includes metadata associated with each representative image included in the plurality of representative images, and the metadata associated with a given representative image included in the plurality of representative images indicates a first point in time in the media title that corresponds to a start point of the sequence of video frames associated with the given representative image.

19. The non-transitory computer-readable storage medium of any of clauses 10-18, wherein the first point in time in the media title corresponding to the start point of the sequence of video frames associated with the given representative image does not correspond to a second point in time in the media title corresponding to a start point of a video frame from which the given representative image is generated.

20. A system, comprising: a memory that stores instructions; and a processor that is coupled to the memory and, when executing the instructions, is configured to: receive a request from a client computing device for a first sequence of video frames included in a media title being streamed to the client computing device for playback; in response to the request, send the first sequence of video frames to the client computing device for playback; and send a representative image for at least one of the first sequence of video frames and a second sequence of video frames included in the media title, wherein the first sequence of video frames is included in the media title and presents a first point of view, and the second sequence of video frames is included in the media title and presents a second point of view.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
receiving a request from a client computing device for a media title being streamed to the client computing device for playback;
in response to the request, determining a first sequence of video frames of the media title, wherein the first sequence of video frames corresponds to a first set of video frames continuously captured at a first point of view;
sending the first sequence of video frames to the client computing device for playback;
determining at least one of:
a first trick play image based on a representative image for the first sequence of video frames continuously captured at the first point of view, or
a second trick play image based on a representative image for a second sequence of video frames included in the media title, wherein the second sequence of video frames corresponds to a second set of video frames continuously captured at a second point of view, wherein the first trick play image and the second trick play image are associated with playback of the media title in a trick play mode; and
sending the at least one of the first trick play image or the second trick play image to the client computing device.

2. The computer-implemented method of claim 1, further comprising:
while sending the first sequence of video frames to the client computing device, sending a manifest referencing a plurality of trick play images to the client computing device,
wherein each trick play image included in the plurality of trick play images is associated with a different sequence of video frames included in the media title, each sequence of video frames being continuously captured at a respective point of view, and the first trick play image and the second trick play image are included in the plurality of trick play images.

3. The computer-implemented method of claim 2, wherein the manifest includes metadata associated with each trick play image included in the plurality of trick play images, and the metadata associated with a given trick play image included in the plurality of trick play images indicates a first point in time in the media title that corresponds to a start point of the sequence of video frames associated with the given trick play image.

4. The computer-implemented method of claim 3, wherein the first point in time in the media title that corresponds to the start point of the sequence of video frames associated with the given trick play image does not correspond to a second point in time in the media title that corresponds to a video frame from which the given trick play image is generated.

5. The computer-implemented method of claim 3, wherein the metadata further includes data associated with the sequence of video frames associated with the given trick play image, wherein the data comprises at least one of a status, an attribute, or a combination of attributes.

6. The computer-implemented method of claim 3, wherein the metadata includes an index that:
when having a first value, indicates one of a first status or first attribute associated with the given trick play image; and
when having a second value, indicates one of a second status or second attribute associated with the given trick play image.

7. The computer-implemented method of claim 3, wherein the metadata associated with the given trick play image indicates that the sequence of video frames associated with the given trick play image is at least one of:
a first sequence of video frames in a scene included in the media title; or
a first sequence of video frames in a chapter included in the media title.

8. The computer-implemented method of claim 1, wherein the second trick play image for the second sequence of video frames comprises a thumbnail image generated from a representative video frame included in the second sequence of video frames.

9. The computer-implemented method of claim 1, wherein:
the first sequence of video frames is captured from a first point of capture at the first point of view; and
the second sequence of video frames is captured from a second point of capture at the second point of view.

10. One or more non-transitory computer-readable storage media including instructions that, when executed by one or more processors, cause the one or more processors to perform the steps of:
receiving a request from a client computing device for a media title being streamed to the client computing device for playback;
in response to the request, determining a first sequence of video frames of the media title, wherein the first sequence of video frames corresponds to a first set of video frames continuously captured at a first point of view;
sending the first sequence of video frames to the client computing device for playback;
determining at least one of:
a first trick play image based on a representative image for the first sequence of video frames continuously captured at the first point of view, or
a second trick play image based on a representative image for a second sequence of video frames included in the media title, wherein the second sequence of video frames corresponds to a second set of video frames continuously captured at a second point of view, wherein the first trick play image and the second trick play image are associated with playback of the media title in a trick play mode, and wherein each sequence of video frames has only one corresponding representative image; and
sending the at least one of the first trick play image or the second trick play image to the client computing device.

11. The one or more non-transitory computer-readable storage media of claim 10, wherein the second trick play image for the second sequence of video frames comprises a thumbnail image generated from a representative video frame included in the second sequence of video frames.

12. The one or more non-transitory computer-readable storage media of claim 11, wherein the representative video frame included in the second sequence of video frames comprises a video frame that meets a threshold quality metric.

13. The one or more non-transitory computer-readable storage media of claim 11, wherein the representative video frame included in the second sequence of video frames comprises an intra-coded frame included in the second sequence of video frames.

14. The one or more non-transitory computer-readable storage media of claim 11, wherein the representative video frame included in the second sequence of video frames comprises an average video frame that is selected based on a difference between the representative video frame included in the second sequence of video frames, and one or more other video frames included in the second sequence of video frames.

15. The one or more non-transitory computer-readable storage media of claim 10, wherein the second sequence of video frames includes a first video frame that is immediately subsequent to a last video frame included in the first sequence of video frames in the media title.

16. The one or more non-transitory computer-readable storage media of claim 10, wherein the second sequence of video frames includes a last video frame that is immediately prior to a first video frame included in the first sequence of video frames in the media title.

17. The one or more non-transitory computer-readable storage media of claim 10, further comprising instructions that, when executed by the one or more processors, cause the one or more processors to perform the step of:
while sending the first sequence of video frames to the client computing device, sending a manifest referencing a plurality of trick play images to the client computing device,
wherein each trick play image included in the plurality of trick play images is associated with a different sequence of video frames included in the media title, each sequence of video frames being continuously captured at a respective point of view, and the first trick play image and the second trick play image are included in the plurality of trick play images.

18. The one or more non-transitory computer-readable storage media of claim 17, wherein:
the manifest includes metadata associated with each trick play image included in the plurality of trick play images, and
the metadata associated with a given trick play image included in the plurality of trick play images indicates a first point in time in the media title that corresponds to a start point of the sequence of video frames associated with the given trick play image.

19. The one or more non-transitory computer-readable storage media of claim 18, wherein the first point in time in the media title that corresponds to the start point of the sequence of video frames associated with the given trick play image does not correspond to a second point in time in the media title that corresponds to a video frame from which the given trick play image is generated.

20. A system, comprising:
   one or more memories that store instructions; and
   one or more processors that are coupled to the one or more memories and, when executing the instructions, perform the steps of:
      receiving a request from a client computing device for a media title being streamed to the client computing device for playback;
      in response to the request, determining a first sequence of video frames of the media title, wherein the first sequence of video frames corresponds to a first set of video frames continuously captured at a first point of view;
      sending the first sequence of video frames to the client computing device for playback;
      determining at least one of:
         a first trick play image based on a representative image for the first sequence of video frames continuously captured at the first point of view, or
         a second trick play image based on a representative image for a second sequence of video frames included in the media title, wherein the second sequence of video frames corresponds to a second set of video frames continuously captured at a second point of view, wherein the first trick play image and the second trick play image are associated with playback of the media title in a trick play mode, and
      wherein each sequence of video frames has only one corresponding representative image; and
      sending the at least one of the first trick play image or the second trick play image to the client computing device.

* * * * *